Figure 1:
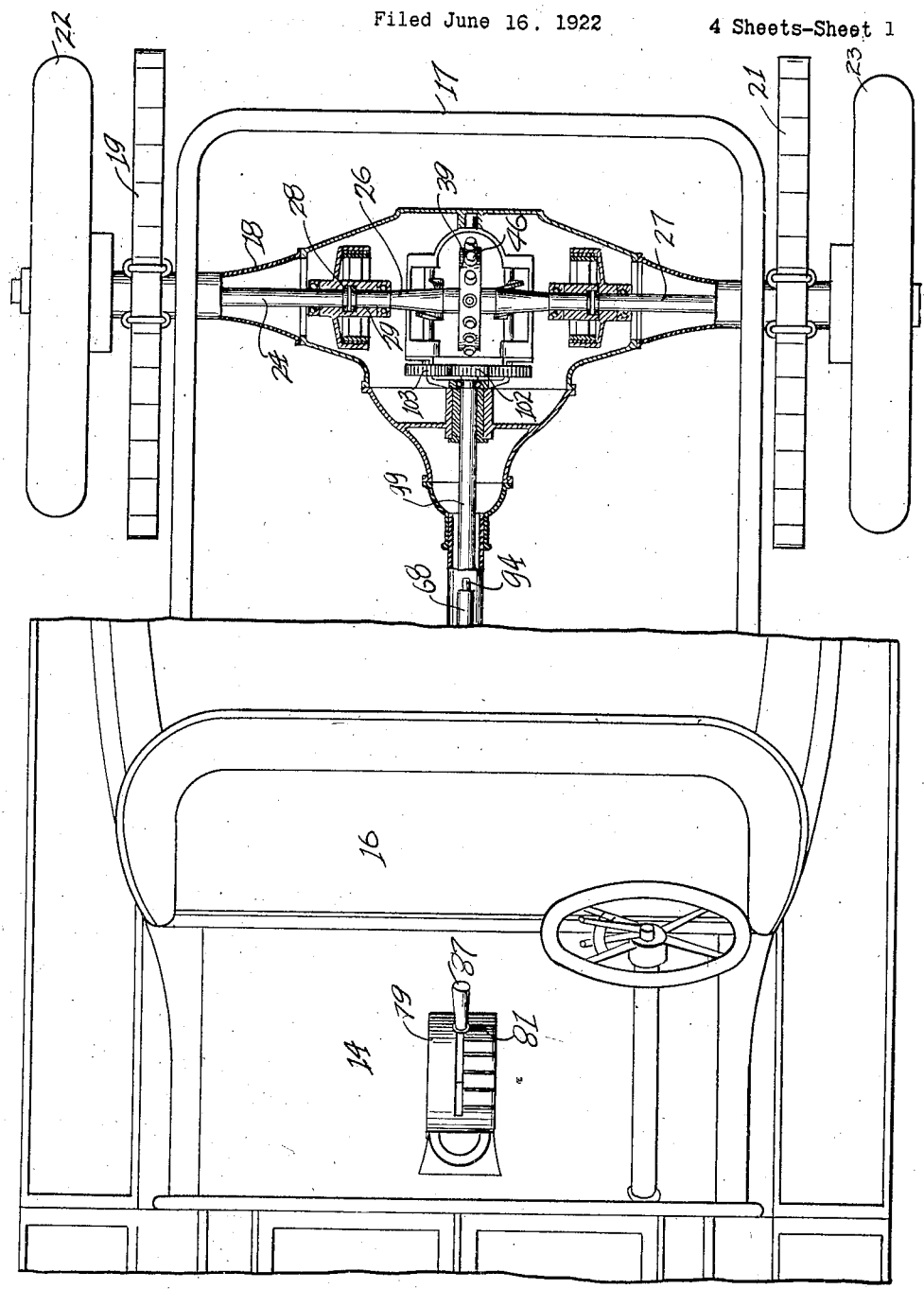

July 31, 1923.

L. M. GARDINER 1,463,687

VEHICLE DRIVING MECHANISM

Filed June 16, 1922

4 Sheets-Sheet 1

Inventor.
Lou M. Gardiner Dec'sd
May D. Gardiner
Administratrix
By Victor J. Evans
Attorney

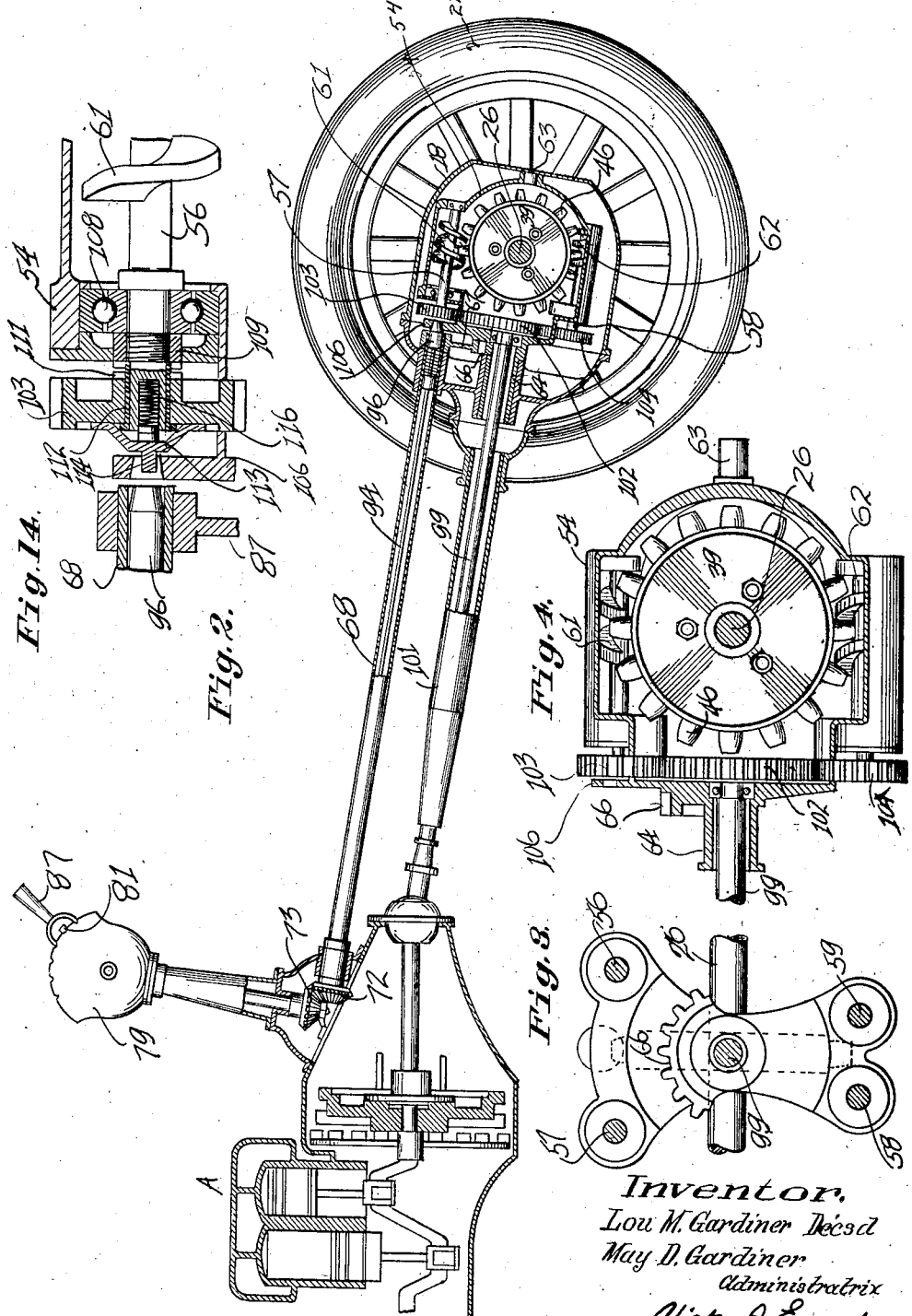

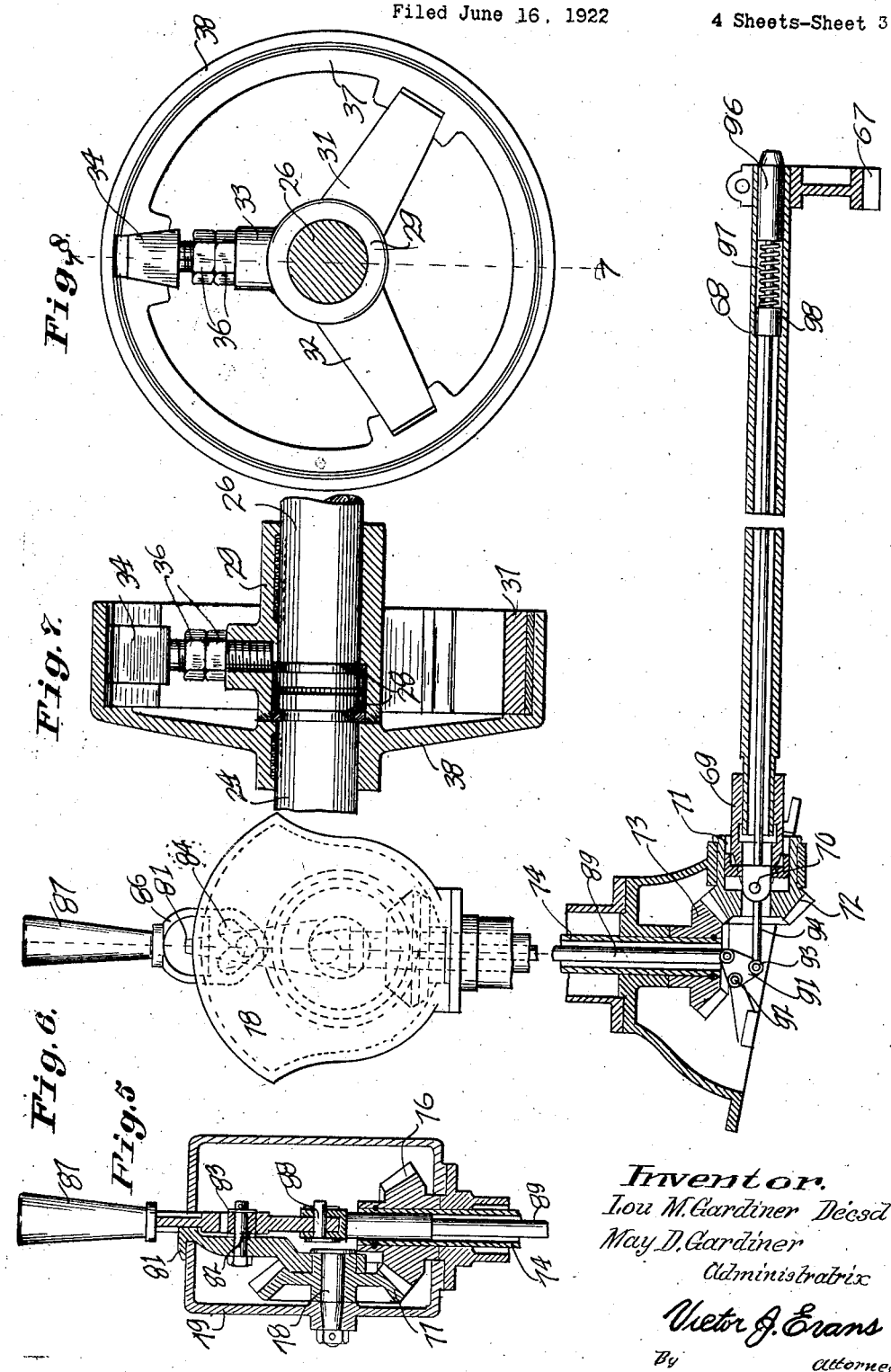

July 31, 1923.
L. M. GARDINER
1,463,687
VEHICLE DRIVING MECHANISM
Filed June 16, 1922
4 Sheets-Sheet 4
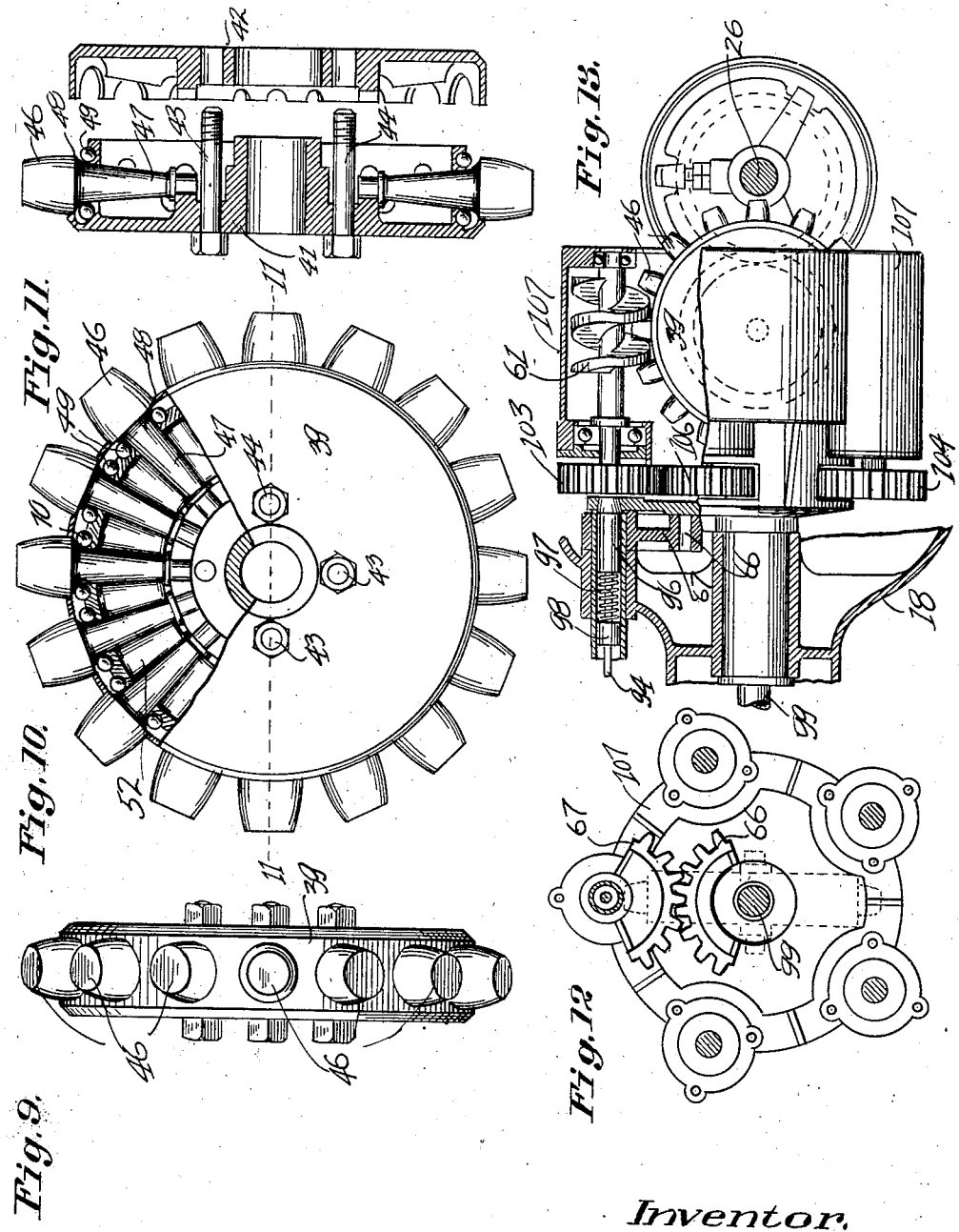
Inventor,
Lou M. Gardiner Dec'd
May D. Gardiner
Administratrix
Victor J. Evans
By Attorney Patented July 31, 1923.

1,463,687

UNITED STATES PATENT OFFICE.

LOU M. GARDINER, DECEASED, BY MAY DURLING GARDINER, ADMINISTRATRIX, OF OAKLAND, CALIFORNIA.

VEHICLE DRIVING MECHANISM.

Application filed June 16, 1922. Serial No. 568,892.

*To all whom it may concern:*

Be it known that I, MAY D. GARDINER, a citizen of the United States, residing at Oakland, in the county of Alameda and State of California, administratrix of the estate of LOU M. GARDINER, late a citizen of the United States, believe the said Lou M. GARDINER to be the inventor of certain new and useful Improvements in Vehicle Driving Mechanism, of which the following is a specification.

This invention relates to improvements in vehicle driving mechanism, the principal object of which is to eliminate the use of a clutch, gear, shifting, brakes, differential gears and all foot levers.

Another object is to reduce loss of power by eliminating the usual friction thereby increasing the efficiency of the vehicle.

A further object is to provide means whereby the various speeds of the vehicle can be easily controlled.

A still further object is to provide means for stopping the vehicle without the usual jar incident to applying a brake. This elimination of the jar also results in reducing the wear and tear on the vehicle.

An additional object is to provide means of such a nature that stripping of the gears will be impossible and at the same time the cost of construction will be considerably reduced.

Other objects and advantages will be apparent during the course of the following description.

In the accompanying drawings forming a part of this specification, and in which like numerals are employed to designate like parts throughout the same, Figure 1 is a top plan view of an automobile partly broken away and partly in section showing my device as applied thereto, Figure 2 is a side elevation of my device showing the driving connection from the engine to the rear wheels, Figures 3 and 4 show the manner in which the master gear is mounted upon the rear axle of a machine, Figures 5 and 6 are detail views of the controlling mechanism, Figure 7 is a cross-section taken on the line 7—7 of Figure 8, Figure 8 is a side elevation of Figure 7, Figure 9 is an end elevation of the master gear, Figure 10 is a side elevation of the master gear, Figure 11 is a cross-section taken on the line 11—11 of Figure 10, and also partly assembled showing the alignment of parts, Figures 12 and 13 are modified forms of driving mechanism wherein the master gear is mounted in front of the rear axle, and Figure 14 is a fragmentary detail view showing an automatic worm clutch.

In driving a machine, it is often difficult to shift gears as at the present time it is necessary to first release the clutch before the shifting operation can be accomplished. There is also a considerable strain upon the teeth of the gears. I propose to eliminate this difficulty by providing clutches upon the rear axle which will absorb the shock of increasing or decreasing the speed of the vehicle which is common when a shifting of the gears takes place.

In the accompanying drawings wherein for the purpose of illustration is shown a preferred embodiment of my invention, the numeral 14 refers to an automobile as a whole having a seat 16 and a chassis 17. This chassis has mounted therebelow a housing 18, which housing is supported from the chassis as by springs 19 and 21. Within the housing 18 is a rear axle upon the extremities of which are mounted wheels 22 and 23. This rear axle is formed in three parts which bear the numerals 24, 26 and 27, the portion 26 being the central portion. It will be noted that each of these sections is provided with an end groove 28, which grooves lie within the coupling 29, it being understood that there is a coupling secured between each of the sections. These couplings are rigidly secured to the axle section 26 as by a key or any other well known means and are provided with radially extending arms 31 and 32 as best shown in Figure 8. A third radially extending arm 33 is provided which has secured thereon an adjustable wedge 34 which is locked in adjusted position by locking nuts 36. These arms 31 and 32 serve to position a clutch shoe 37, while the wedge 34 is positioned between the ends of the clutch shoe so that as it is expanded the shoe 37 will expand against the interior of a clutch 38. This clutch is secured upon the next adjacent axle section which is represented by the numeral 24 in Figure 7.

It will thus be seen that this forms a means for connecting the three sections of axle one to the other.

The numeral 39 refers to a master gear as a whole, the construction of which is best shown in Figures 9, 10, and 11, where it will be noted that two casting members 41 and 42 are provided which are adapted to be bolted together as by bolts 43 and 44. These castings 41 and 42 serve to position a series of radial teeth 46, which teeth are provided with tapered shanks 47, and with cone portions 48. These cone portions 48 are adapted to contact balls 49 carried in a raceway formed upon the casting 41. These balls are held in their respective raceways as by the tooth cones and the teeth are in turn held by the contacts of the rollers 52 which are positioned between the tapered extremities 47. The master gear thus constructed is positioned upon the axle portion 26 as shown in Figures 1 and 2.

By now referring to Figure 4, it will be noted that a casting 54 is provided which casting surrounds the master gear 39 and has the contour best shown in Figure 3. This casting serves to position shafts 56, 57, 58 and 59. Upon these shafts and at a point within the casting 54 are mounted worms as shown at 61 and 62 of Figure 4. These shafts are radially spaced so that as the casting 54 is revolved upon its trunnions 63 and 64, the worms mounted on their respective shafts, will be successively brought into engagement with the master gear 39. In order to revolve this casting 54, I have provided a segmental gear 66 secured to the casting 54. This segmental gear is adapted to be contacted by a segmental gear 67 as best shown in Figure 6, which gear is secured upon a tubular shaft 68, the opposite end of which is splined to a universal joint 69 mounted within the hollow portion 71 of a bevel gear 72. This bevel gear in turn meshes with a bevel gear 73 secured to a tubular shaft 74, the upper extremity of which has a bevel gear 76 meshing with a bevel gear 77. This bevel gear is mounted upon a stud 78 secured in the side of a casing 79, the upper surface of which is in the form of a quadrant as best shown in Figure 6, and is adapted to have a pointer 81 move thereover, which pointer is secured to the bevel gear 77. The pointer 81 has provided thereon a stud 82 having a roller 83, which roller moves within a V slot 84 formed in a lever 86 terminating in a handle 87. The lower extremity of this lever 86 is pivoted as at 88 to a rod 89, which rod extends downwardly through the tubular shaft 74 and is pivoted to a lever 91, which lever is pivoted as at 92 to a suitable support. A rod 94 is in turn pivoted as at 93 to the lever 91, which rod extends through the tubular shaft 68 and is connected to a bolt 96. A spring 97 serves to retain the bolt 96 in its extended position, one end of the spring contacting the bolt and the opposite end contacting a collar 98 positioned within the tubular shaft 68. At 99 I have shown the usual propeller shaft of an automobile, which is mounted within the usual housing 101. This propeller shaft is provided with a driving gear 102 which gear is adapted to be in constant mesh with gears radially disposed thereabout and secured upon the shafts 56, 57, 58 and 59. Two of these gears are shown in Figure 4 and are represented by the numerals 103 and 104. A plate 106 is formed integral with the casting 54 and is provided with a series of openings therein which openings are adapted to receive the extremity of the bolt 96 as is best shown in Figure 2.

By now referring to Figures 12 and 13, it will be noted that I have provided a modified form wherein the worm gears are mounted in a barrel designated by the numeral 107, which barrel is rotatable about the master gear 39, which master gear is mounted in front of the rear axle instead of being mounted thereupon. The operation of the device is similar to that shown in Figures 3 and 4.

Owing to the nature of a worm, it will be impossible to throw a worm into engagement with the master gear under full load as the side thrust would be too great, therefore, in order to accomplish this movement a worm clutch is provided as illustrated in Figure 14, wherein the numeral 61 represents one of the worms which is mounted upon the shaft 56 and mounted in the bearing 108, it of course being understood that this bearing is supported in the casting 54. At 109 I have shown a clutch member having projecting teeth, which are adapted to engage teeth 111 formed upon the rear surface of the gear 103. This gear is free to rotate upon a bushing 112. A cap 113 is secured to the outer extremity of the gear 103 and is provided with a tit 114 which extends into one of the openings in the plate 106. A spring 116 bears against the shaft 56 and against the rear of the cap 113. The operation of this clutch is as follows:

As the casting 54 is revolved together with its gears and attached plate 106, one of the openings in the plate 106 is brought into alignment with the bolt 96 which, when it is released, will enter the plate 106 and strike the tit 114, and as the spring abutting the bolt is relatively strong in comparison to the spring 116 consequently the same will be overcome and the gear 103 will be moved rearwardly so as to cause the teeth 109 and 111 to engage each other thereby establishing a drive between the gear 103 and the worm 61. It is obvious that as soon as the bolt 96 is withdrawn from engagement with the tit 114, the spring 116 will cause the teeth 109 and 111 to become disengaged. This clutch therefore allows the clutch to be thrown into engagement with the master gear and to be afterwards locked in driving engagement.

The operation of my device is as follows:—

Assuming that the same is mounted upon an automobile as illustrated in Figures 1 and 2, and that power is being delivered by the motor A directly to the propeller shaft 99, the result will be that the gear 102 will revolve all of the shafts 56, 57, 58 and 59 which in turn will rotate the worms mounted thereon. These worms are each of a different lead with the result that if they are successively brought into contact with the master gear, a different speed ratio will be obtained. Assuming that the parts are in the neutral position, the handle 89 is grasped and moved either forwardly or rearwardly depending upon the maneuver to be executed. Upon movement of this handle, the roller 83 is caused to ride within the V slot 84 thereby causing the lever 86 to move downwardly which movement is transmitted through the rod 89, lever 91, rod 94, with the result that the bolt 96 is withdrawn from its engagement with the plate 106. Further movement of the handle 89 will transmit motion to the bevel gear 77, bevel gear 76, tubular shaft 74, bevel gear 73, gear 72, universal joint 69, tubular shaft 68 and segmental gear 67. Movement of this segmental gear will in turn be transmitted to the segmental gear 66, which rotates the casting 54, and depending upon the amount of rotation, will govern the worm which is brought into contact with the master gear. One of the worms is made with teeth at right angles to the length of the shaft with the result that when it is brought into contact with the master gear, the master gear will be brought to a standstill, and if the car is moving, the natural momentum will cause the clutches to slip and as the master gear and the central part of the shaft are held stationary, the clutch shoes will act to bring the vehicle to a gradual stop, it being understood that the tension of these clutch shoes is greater than the torque of the engine but less than the traction of the vehicle, consequently, they will deliver all of the power that the engine can produce to the rear wheels but will allow for a differential action due to traction in turning a corner.

By dividing the axle into three sections and placing a clutch as just described between these sections, I provide means for stopping the vehicle as well as means for allowing a differential action while rounding a curve without the employment of the usual gear differential.

It will thus be seen that I have provided comparatively simple means for operating a vehicle, the same comprising the throwing of a single lever which automatically unlocks the casting containing the worms, rotates this casting, and again locks the same thereby moving into contact with the master gear a new worm of a different lead.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:—

1. In a device of the character described, the combination with an automobile chassis, of an axle mounted therebelow, a master gear mounted on said axle, and a series of worms arranged in circular series about said master gear and adapted to be brought into successive engagement with said master gear.

2. In a device of the character described, the combination with an automobile chassis, of an axle mounted therebelow, said axle being formed in sections, clutch means between each of said sections, a master gear mounted on said axle, a series of worms arranged in circular series about said master gear, and means for successively moving said worms into contact with said master gear.

3. In a device of the character described, the combination with an automobile chassis, of a housing resiliently mounted below said chassis, a divided axle extending through said housing, wheels secured to the extremities of said axle, a master gear mounted on one of said sections, clutches between said sections on which said master gear is mounted and said sections on which said wheels are secured, and a series of worms arranged in circular series about said master gear said worms being of different leads and adapted to be brought successively into contact with said master gear.

4. In a vehicle driving mechanism, the combination with an automobile chassis, of a housing mounted beneath said chassis, a divided axle extending through said housing, connecting means between the adjacent sections of said divided axle, a master gear mounted on one of said sections, a casting surrounding said master gear, a series of worms mounted in said casting and arranged in circular series about said master gear, each of said worms being provided with a different lead, means for driving said worms, and means for moving said worms into successive engagement with said master gear.

5. In a vehicle driving mechanism, the combination with an automobile chassis, of power means mounted thereon, a propeller shaft extending rearwardly therefrom, a gear secured to said propeller shaft, a series of gears circumferentially disposed about said driving gear, shafts extending rearwardly therefrom, worms formed on said shafts, said worms having varying leads, an axle mounted below said chassis, a master gear mounted on said axle, and means for rotating said radially disposed gears about said driving gear for the purpose of successively causing said worms to engage said master gear.

6. In a vehicle driving mechanism, the combination with an automobile chassis, of power means mounted thereon, a propeller shaft extending rearwardly therefrom, a gear secured to said propeller shaft, a series of gears circumferentially disposed about said driving gear, shafts extending rearwardly therefrom, worms formed on said shafts, said worms having varying leads, an axle mounted below said chassis, a master gear mounted on said axle, means for rotating said circumferentially disposed gears about said driving gear for the purpose of successively causing said worms, to engage said master gear, and a sliding bolt adapted to prevent rotation of said radially disposed gears, about said driving gear, except when said rotating means is operated.

7. In a vehicle driving mechanism, the combination with an automobile chassis, of power means mounted thereon, a propeller shaft extending rearwardly therefrom, a gear secured to said propeller shaft, a series of gears circumferentially disposed about said driving gear, shafts extending rearwardly therefrom, worms formed on said shafts, said worms having varying leads, an axle mounted below said chassis, a master gear mounted on said axle, means for rotating said circumferentially disposed gears about said driving gear for the purpose of successively causing said worms to engage said master gear, a sliding bolt adapted to prevent rotation of said radially disposed gears about said driving gear except when said rotating means is operated, and a clutch disposed between each of said radially disposed gears and their respective rearwardly extending shafts, said clutch being adapted to be operated by said sliding bolt.

In testimony whereof, I affix my signature.

MAY D. GARDINER,
*Administratrix of Lou M. Gardiner, deceased.*